(12) United States Patent
Dassow et al.

(10) Patent No.: US 7,512,152 B1
(45) Date of Patent: Mar. 31, 2009

(54) METHOD FOR USING DIGITAL DATA NETWORKS FOR THE TRANSMISSION OF DATA VIA VOICE CONNECTION PATHS

(75) Inventors: Heiko Dassow, Griesheim (DE); Klaus-Peter Zeffler, Darmstadt (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/673,520

(22) PCT Filed: Feb. 27, 1999

(86) PCT No.: PCT/EP99/01284

§ 371 (c)(1),
(2), (4) Date: Oct. 17, 2000

(87) PCT Pub. No.: WO99/55069

PCT Pub. Date: Oct. 28, 1999

(30) Foreign Application Priority Data

Apr. 17, 1998 (DE) ................................. 198 17 007

(51) Int. Cl.
*H04L 5/22* (2006.01)
*H04J 3/18* (2006.01)
*H04J 1/02* (2006.01)
*H04J 3/16* (2006.01)

(52) U.S. Cl. ........................ 370/468; 370/298; 370/477; 370/493; 379/93.01; 379/93.08

(58) Field of Classification Search ......... 370/352–359, 370/401, 468, 494, 493, 522, 526, 524, 395.4, 370/395.2, 298, 299; 358/1.15, 407, 426.01, 358/426.16; 380/260, 261, 255, 218, 18, 380/49, 59, 20; 379/100.17, 100.14, 100.1, 379/100.2

See application file for complete search history.

(56) References Cited

U.S. PATENT DOCUMENTS

| | | | | |
|---|---|---|---|---|
| 4,156,880 A | * | 5/1979 | Yamada | 358/3.29 |
| 5,872,845 A | * | 2/1999 | Feder | 358/442 |
| 6,249,531 B1 | * | 6/2001 | Jacobi et al. | 370/477 |
| 6,493,355 B1 | * | 12/2002 | Henderson et al. | 370/468 |
| 6,552,826 B2 | * | 4/2003 | Adler et al. | 358/442 |
| 6,683,888 B1 | * | 1/2004 | Henderson et al. | 370/468 |
| 7,003,114 B1 | * | 2/2006 | Mauro | 380/261 |
| 2001/0035977 A1 | * | 11/2001 | Alder et al. | 358/1.15 |

FOREIGN PATENT DOCUMENTS

| | | |
|---|---|---|
| WO | 97 47107 | 12/1997 |
| WO | 98 13996 | 4/1998 |

OTHER PUBLICATIONS

Various discussions regarding voice transmission over the Internet cited in the magazine iX, Aug. 1997, pp. 32-33.
K. Toyoda et al., "WIDE Message-based Fax over the Internet," WIDE Project in Application Area, Internet-Draft, Jul. 28, 1997, pp. 1-4.

(Continued)

*Primary Examiner*—Hanh Nguyen
(74) *Attorney, Agent, or Firm*—Kenyon & Kenyon LLP

(57) ABSTRACT

A method for reducing bandwidth when transmitting data between a sending terminal and a receiving terminal over a voice connection path using a digital data network. The coding of user information is converted within the digital data network between data transmission in the voice connection path and data transmission in the digital data network so that the user information is transmitted on one section of the digital data network via the coded voice connection path and the user information is transmitted on another section of the digital data network using a method suitable for the digital data network.

9 Claims, 5 Drawing Sheets

OTHER PUBLICATIONS

German Patent Application No. P 9538, "Verfahren zur Verteilung von Fax-Dokumenten über ein EDV-System (Method for Distributing Fax Documents Via an EDP System)".

L. Masinter, "Requirements for Internet Fax," Xerox Corp., Application Area Internet-Draft, Nov. 4, 1997, pp. 1-3.

* cited by examiner

METHOD FOR USING DIGITAL DATA NETWORKS FOR THE TRANSMISSION OF DATA VIA VOICE CONNECTION PATHS

FIELD OF THE INVENTION

The present invention relates generally to a method for using digital data networks, and in particular, to a method for reducing bandwidth when transmitting data between a sending terminal and a receiving terminal over a voice connection path using a digital data network.

RELATED TECHNOLOGY

For the purpose of data transmission, communication networks exist which are used exclusively for transmitting digitally coded data (data, voice, tone signals, images) between terminals, and which have been suitably optimized for this application purpose.

Owing to the limited worldwide availability of such networks, even today a multitude of data is still transmitted over analog voice connection paths. In this case, modulators and demodulators (MODEMs) are used to adapt the binary-coded data to the analog transmission characteristics of the voice connection paths.

As a result of the growth of data networks, especially of the data network known as the INTERNET for the worldwide interconnection of computer networks, methods have also become established which transmit speech in coded form over data networks.

Due to the now far-advanced digitization of analog telecommunications networks, hardly any pure analog, i.e., exclusively analog, voice connection paths remain.

Today, generally only the subscriber access line is operated in analog manner, while the long-distance transmission of the voice information is carried out using digital transmission methods. Normally, a transmission rate of 64 kbit/s is used in telecommunications networks for an analog voice transmission path standardized according to CCITT (Commité Consultative International Télégraphique et Téléphonique—International Advisory Committee for Telegraph and Telephone Services). The most well-known systems for wire-bound voice transmission are PDH (Plesiosynchronous Digital Hierarchy—standardized system for digital data transmission), SDH (Synchronous Digital Hierarchy—international standard for synchronous transmission networks) and ATM (Asynchronous Transfer Mode—digital transmission method, e.g., for broadband ISDN, in which the entire capacity of a transmission channel is split, depending on demand and time, between a few or many connections which then use the channel jointly). For wireless transmission of speech in mobile communication networks, use is made of the DECT standard (Digital Enhanced (European) Cordless Telecommunication—uniform digital standard for cordless telephones, wireless telecommunications systems and wireless LANs in Europe) as well as of the GSM standard (Global Systems for Mobile Communication—worldwide mobile communication standard for digital, cellular mobile communication networks). Likewise, there has recently been discussion about voice transmission over the Internet, as indicated in the magazine iX in August 1997, page 32.

Even if the voice connection path is set up by these technical processes, the full bandwidth of the voice channel of, for example, 64 kbit/s must be transmitted for a narrowband (low-bit-rate) data transmission over such a voice connection path. This is necessary so that the receiving data terminal will be able to decode the original data from the voice channel. This means that the theoretically possible useful data rate of a digital transmission link over which the low-bit-rate data must be transmitted is not fully utilized. However, this is very disadvantageous when the transmission capacity thus utilized is particularly expensive, as is the case, for example, with satellite connections or overseas cables.

Owing to the already existing multifunctional digital networks, it is likewise possible to transmit data and voice using the same system resources. In this case, it is no longer necessary to use a voice connection path for data transmission between two terminal systems. Therefore, the full bandwidth of the digital data connection can be used for transmitting the user information, i.e., the information desired to be transmitted from one of the terminal systems. However, this method requires that both terminals be directly connected to the multifunctional network, and that both terminals have been technically prepared for this type of data transmission.

Group 3 facsimile transmission (FAX) is typical of a multitude of applications for data transmission over voice connection paths. In this case, the voice connection path of a dialed telecommunications connection is used for transmitting image information. Although there is also a FAX Group 4 variant which is capable of transmitting the image information over the multifunctional ISDN network without using analog voice connection paths, this variant is presently still very little used, so that most Group 4 FAX machines are downward-compatible with Group 3.

Likewise known is a method in which the FAX user information is not directly printed as an image at the communication endpoint, but is temporarily stored in digital form in an electronic data processing system (EDP), as indicated in the magazine iX in August 1997 on page 35. In this case, the digital data processing system is used for the manual or automatic relay of the FAX user information to a dedicated workstation or for archiving and logging the information sent and received.

The details of this method, known as "FAX by e-mail", are described more fully in a study "WIDE Message-based Fax over the Internet" by Kiyoshi Toyoda et al. from the WIDE Project in Application Area, INTERNET-DRAFT, July 1997, pages 1 to 5.

Further known in this connection is the automatic further processing of the FAX information in the receiving data processing system, as shown by an example (German Patent Application P 9538 entitled "Verfahren zur Verteilung von Fax-Dokumenten über ein EDV-System" [Method for Distributing Fax Documents Via an EDP System].

In addition, various methods already exist which permit the conversion of the FAX modulation into a data modulation. In a method according to U.S. Pat. No. 5,513,212, this conversion is only carried out exclusively for the purpose of the simultaneous transmission of FAX and voice modulation with the aid of so-called SVD modulation. This publication contains no suggestion whatsoever for the digital transmission of data with the aim of bandwidth reduction.

Another method, described in a study "Requirements for Internet Fax" by Larray Masinter from the Xerox Corp. in "Application Area INTERNET-DRAFT", dated Nov. 4, 1997, pages 1 to 4, employs a digital network to transmit the originally analog-modulated information in digital form between two converting modems which, functionally, must be disposed directly at the transition into the data network.

All these known methods suffer from the serious disadvantage that they are limited only to the transition between various services and to the conversion of individual services handled via a voice connection in the voice connection path.

World Patent Document No. WO 97/47107 discloses a method and a device for connecting a fax machine to a digital communication network. In order to be able to transmit a fax message from one fax machine to another using digital communication, an interface which converts the fax message to be transmitted into an image data file is allocated to each fax machine. The image data file is subsequently transmitted via an analog line or an ISDN line of a public, circuit-switched network or a private telephone line to a server. In the server, the image data file is embedded into a data file and is supplied to a data path of a data network.

SUMMARY OF THE INVENTION

Therefore, an object of the present invention is to provide a method for avoiding the problems, discussed above, with regard to the transmission bandwidth of known methods which make no contribution to reducing the transmission paths used for transmitting user information.

The problem of reducing bandwidth when transmitting data over voice connection paths routed in a digital data network is solved by the present invention, in that both the sending and the receiving terminals use a similar method for transmitting data in voice connection paths, but the user information to be transmitted (i.e., the information that is desired to be transmitted from a terminal) is transported in one or more sections via a data network, the modulation method specified by the terminal not being used over the entire transmission link in direct manner via one or more switching nodes or in indirect manner via a data network. Rather a conversion of the coding of the user information between the data transmission in the digitally transmitting voice connection path and the data transmission in the digital data network is first carried out within the data network, so that on some sections of the data network, the user information is transmitted via the coded voice connection path, and on the other sections of data network, the user information is transmitted by a method suitable for digital data networks. There is no need for special functional matching of the terminals or for the terminals to be specially adapted to the transmission characteristics of the digital data network for the transmission of the user information.

In an embodiment of the method according to the present invention, the inclusion of a digital data network in the voice connection path used for data transmission is effected automatically by a context-related call-number translation during the connection setup, this not being perceived by the terminals using the voice connection path.

Furthermore, the digital data network is included in the voice connection path used for voice transmission in such a way that the end-to-end signaling of the terminals, required for the control of data transport, is terminated at the transition into the digital data network used for transmission and is newly generated in order to thus integrate the control of the data transport by the digital data network into this end-to-end signaling.

Moreover, there is suitable temporary storage and conversion of the transmitted data and signaling information, so that different methods of the terminals involved in the data transmission can be used.

Another embodiment of the method according to the present invention provides for the user information to be split into small data packets for its transmission over the digital data network, and thus to be flexibly adapted to the bit rate actually being transmitted by the terminal.

The method according to the present invention further provides that at least one of the terminals be connected directly or via a digital transmission link to the digital data network, with the result that the data need not first be coded by the terminal for transmission in the voice connection path and then decoded again.

The method according to the present invention may be implemented in a data network which is an individual data network or which is made up of an interconnection of a plurality of individual data networks.

The user information to be transmitted may in an embodiment of the method according to the present invention conform to the features of FAX class 3.

In another embodiment of the method according to the present invention, using cryptographic processes the user information in the digital data network is protected against passive monitoring, alteration and/or simulation of incorrect call data and/or contents.

The method according to the present invention permits what is not possible with the previously known methods, namely, to dispose the devices required for conversion at central locations of the data network and, therefore, not to have to provide such a conversion at every transition from a conventional voice connection path and a digital data network.

Consequently, it may be of great advantage that, according to the problem of bandwidth reduction solved by the present invention, the long-distance transmission of the user information now requires only the bandwidth which the terminal actually requires for the transmission of the information. In the case of a FAX Group 3 connection at the presently customary 14400 bit/s, therefore, only slightly more than 14400 bit/s is actually required for transmission, instead of the usual 64 kbit/s (e.g. in the ISDN D-channel), for coding in the voice channel. This corresponds approximately to a reduction of the required bandwidth to ¼ of the original capacity. The digital transmission of the user information over any data network can be so integrated into the connection that the participating terminals are unable to detect whether the transmission is being effected completely via a voice connection path or whether the transmission is being effected partially via an independent data network. This also ensures that, as is generally customary in the case of FAX services, the successful termination of the connection is acknowledged.

It may be that the use of data networks for the delayed forwarding of the information has been used when working with EDP-supported switching of FAX information; there, however, the FAX switching represents an end point for the acknowledged FAX transmission and is not used for the transparent transmission of the FAX information. Consequently, in contrast to a method according to the present invention, a true end-to-end acknowledgment of the successful transmission of the FAX information is then not possible.

A further advantage of the present invention can be seen in that, in contrast to the already known use of data networks for the real-time transmission of FAX information, the method according to the present invention can be implemented significantly more cost-effectively. Thus, using the present invention, the conversion from data modulation in the voice connection path to data transmission in the data network can be effected at a central location of the data network. Consequently, depending on the limiting condition, it is possible to decide individually for each connection whether, for one or more sections, data transmission in the voice connection path is to be converted or not. In the case of connections using only transmission links having sufficiently great transmission reserves, the more cost-effective solution might be to transmit the data in the voice connection path routed via a data network, without additional conversion. If, however, long sections have to be routed over heavily loaded transmission links of the data network, then the data transmission conversion implemented by the method according to the present invention can significantly reduce the data rate on the heavily loaded sections.

BRIEF DESCRIPTION OF THE DRAWINGS

Hereinbelow, the present invention is elaborated upon on the basis of the drawings, in which.

DETAILED DESCRIPTION

Figure 1:
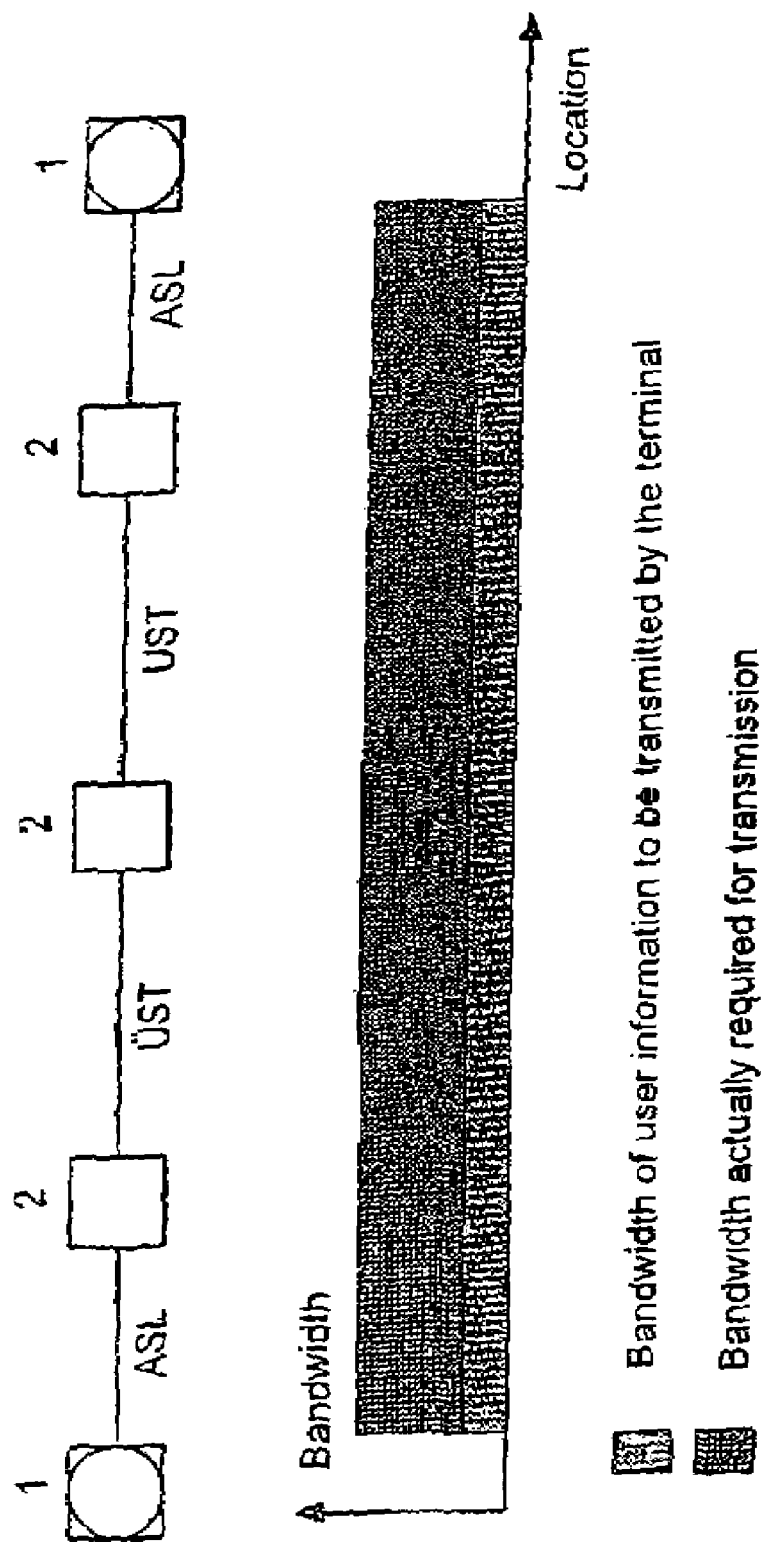
FIG. 1 shows a schematic representation of a prior art basic structure of data transmission in voice connection paths, including a graphical representation of the required transmission bandwidth.

FIG. 1 shows a schematic representation of a prior art basic structure of data transmission in voice connection paths. The two terminals 1 are connected via an access line ASL to one of a plurality of exchanges 2. These exchanges are interconnected via voice connection paths ÜST. In order to set up a connection, usually one of the two terminals 1 sends its destination information to the corresponding exchange 2 which thereupon sets up a voice connection path ÜST between the two terminals 1. Owing to their technical construction, both terminals 1 are capable of coding the data for transmission in such a manner that it can be transmitted via a voice connection path. Such coding is based normally on multi-frequency tone signals of the kind known, for example, from multi-frequency tone dialing.

Usually, at the beginning of the connection, both terminals 1 test the characteristics of the voice connection path ÜST and of their own device type, in order then to agree interactively on a transmission method which makes optimal use of the voice connection path. However, in determining the transmission method, it is virtually irrelevant how the individual transmission links ASL, ÜST and exchanges 2 involved in the connection are actually technically implemented, i.e., whether, for example, the transmission and switching in a certain section are analog or digital.

To illustrate the transmission bandwidth required in the individual sections ASL, ÜST of the transmission link, the transmission bandwidth actually required in each case is shown below the end-to-end connection in the bottom part of FIG. 1, and likewise in FIGS. 2 and 3; in the example shown in FIG. 1, an exclusively digital transmission method and digital switching for the voice connection path have been assumed.

Figure 2:
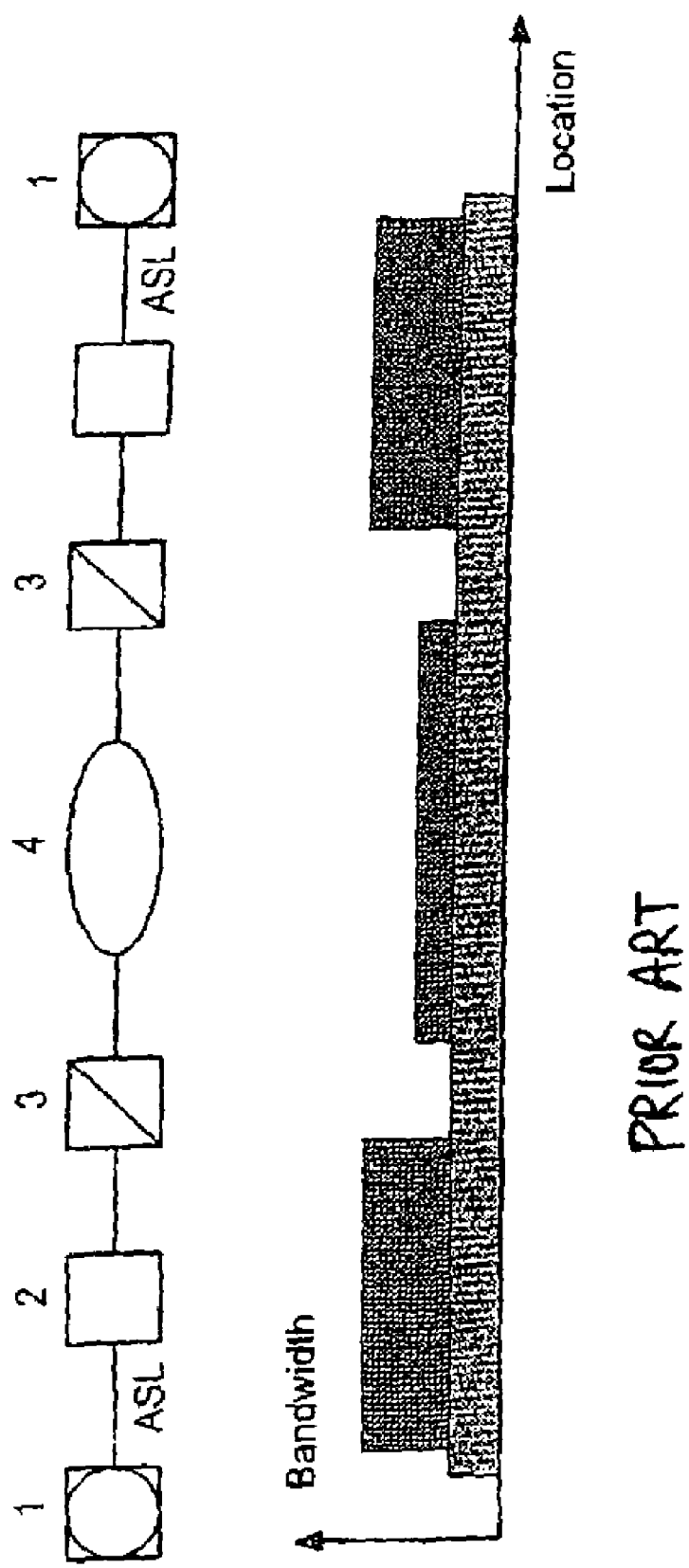
FIG. 2 shows a schematic representation of a prior art method for a service-specific utilization of a data network, including a graphical representation of the required transmission bandwidth.

FIG. 2 shows a known transmission method for FAX information. As already described in connection with FIG. 1, terminal 1 sends data via a voice connection path which is made available by way of its access line ASL and assigned exchange 2.

Unlike in the straight-through voice connection path shown in FIG. 1, a data network 4 is used for transmitting the user information. At transition 3 into data network 4, the voice connection path is terminated and the data transmitted therein is routed directly via data network 4 to assigned transition 3, from where data is then transmitted again via a voice connection path.

In this connection, however, it should be mentioned that, within data network 4, the bandwidth required for information transmission is only slightly less than the user information sent by the terminal, as is indicated in the bottom part of FIG. 2, as well. However, it should also be emphasized that, in this example, the voice connection path is not routed via data network 4, but is terminated at transition 3 and is newly generated, so that in none of the transmission-path sections used here is the voice connection path transmitted via a digital data network, something which is, however, needed for a method according to the present invention as described in the following, because an object of the present invention is to save on transmission bandwidth during transmission via a digital data network.

In an embodiment of the method according to the present invention, for the transition from the voice connection path to the data network, use is advantageously made not of special modems adapted to the type of voice transmission, but of the normal telephone gateways for voice traffic.

Figure 5:
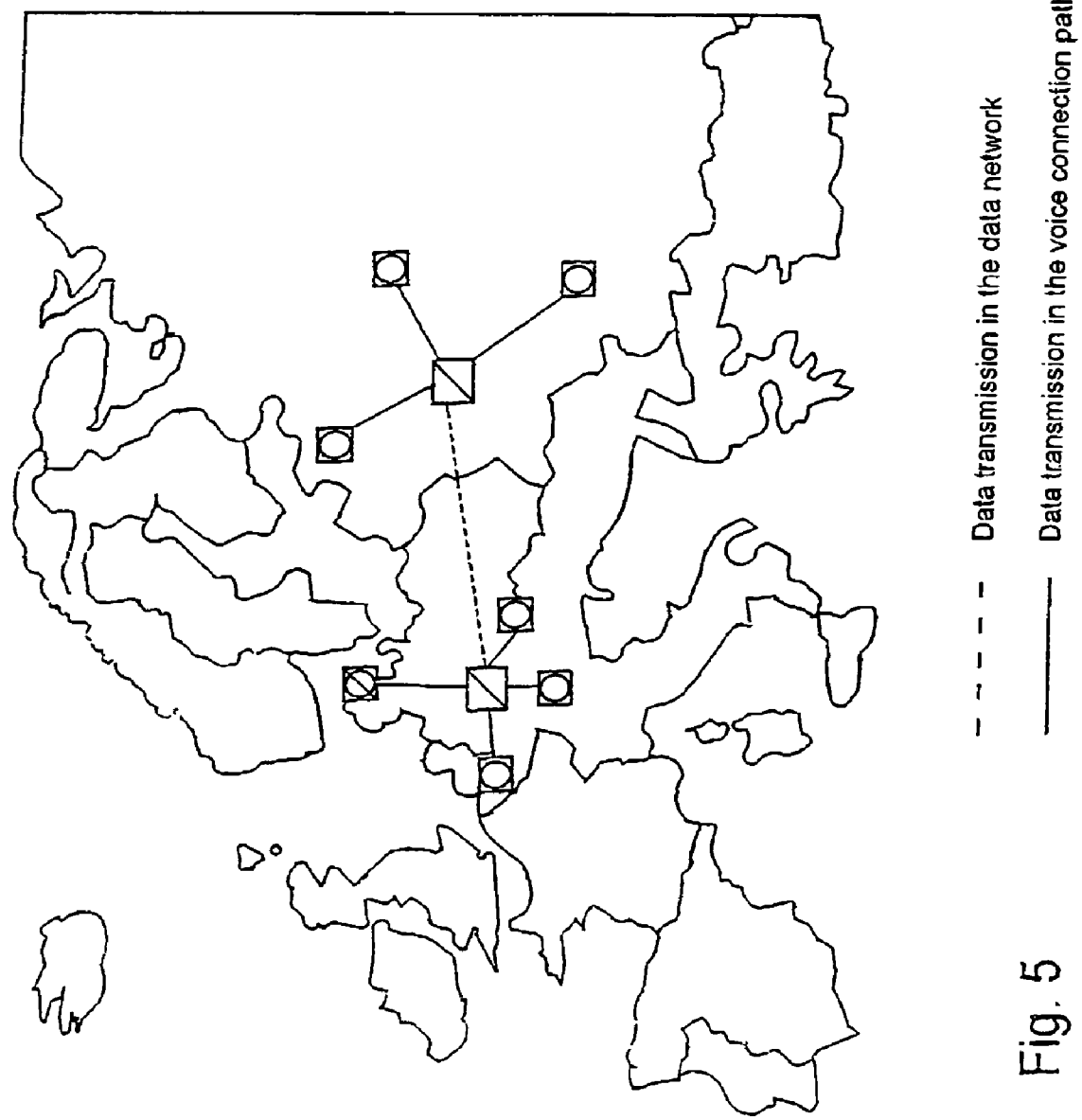
FIG. 5 shows a simplified schematic representation of a network implemented in accordance with an embodiment of the method according to present invention.

The actual transition from data transmission in the voice connection path to transmission in the digital data network may advantageously take place at several central locations in the data network, as roughly indicated in FIG. 5. Thus, the transition between transmission in the digitally routed voice connection path and data transport in the data network can be flexibly realized, and the voice connection paths can be connected to the data network by already existing devices which need not be modified to suit the method according to the present invention.

Figure 3:
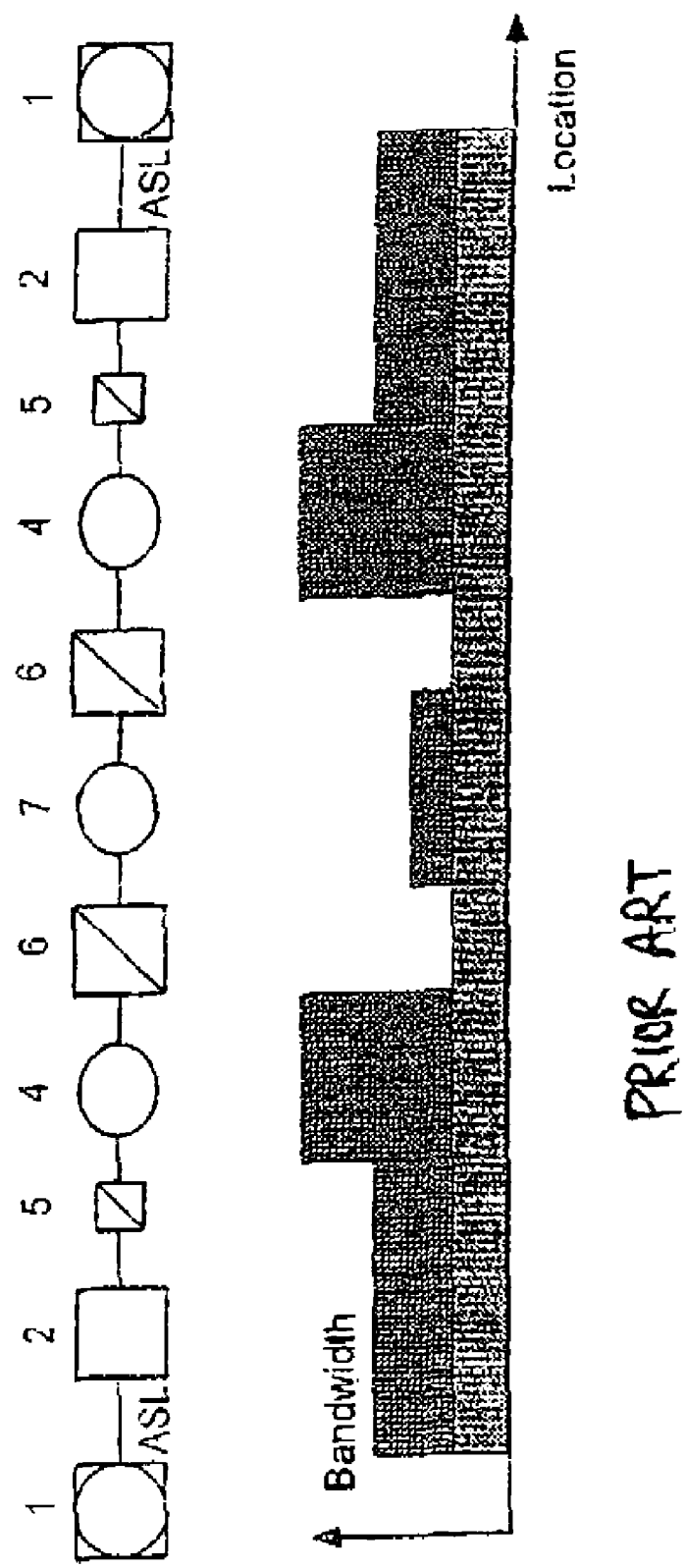
FIG. 3 shows a schematic representation of an embodiment of the method according to the present invention, including a graphical representation of the required transmission bandwidth.

An embodiment of the method according to the present invention is illustrated in FIG. 3. A voice connection path begins at a terminal 1 and, as also in the two previously described prior methods, is routed via an access line ASL and one or (not shown) more exchanges 2. In contrast to the known method shown in FIG. 2, in this case the voice connection path is not terminated at a transition 5 to a data network 4, but the entire voice connection path, including the user information modulated therein, is routed in data network 4. The slightly greater bandwidth requirement in comparison with the pure voice connection path results from the additional control information which is always required in a data network. The method according to the present invention can be employed within this routing of the voice connection path in the data network, and the user information modulated in the voice connection path can be converted at transition 6 between the end of one data network 4 and the start of the next data network 7 used for transmission, and can be transmitted directly over the aforementioned next data network 7.

In an embodiment, the method according to the present invention can be integrated particularly simply into an existing data network if the inclusion of the data network in the voice connection path used for data transmission, as well as the inclusion of transmission sections operated using the method according to the present invention, are accomplished automatically by context-related call-number translation.

Call-number translation is possible either if the terminal setting up the connection also sends an identifier for the desired service, e.g., FAX, or if information concerning which access line will be used exclusively for data transmission in the voice connection path is stored in the exchange assigned to the terminal. In this case, no special call number needs to be dialed when setting up the connection to ensure that data transmission in the voice connection path is replaced by data transmission in the data network. This is accomplished automatically by the aforementioned call-number translation in the telecommunications network.

Figure 4:
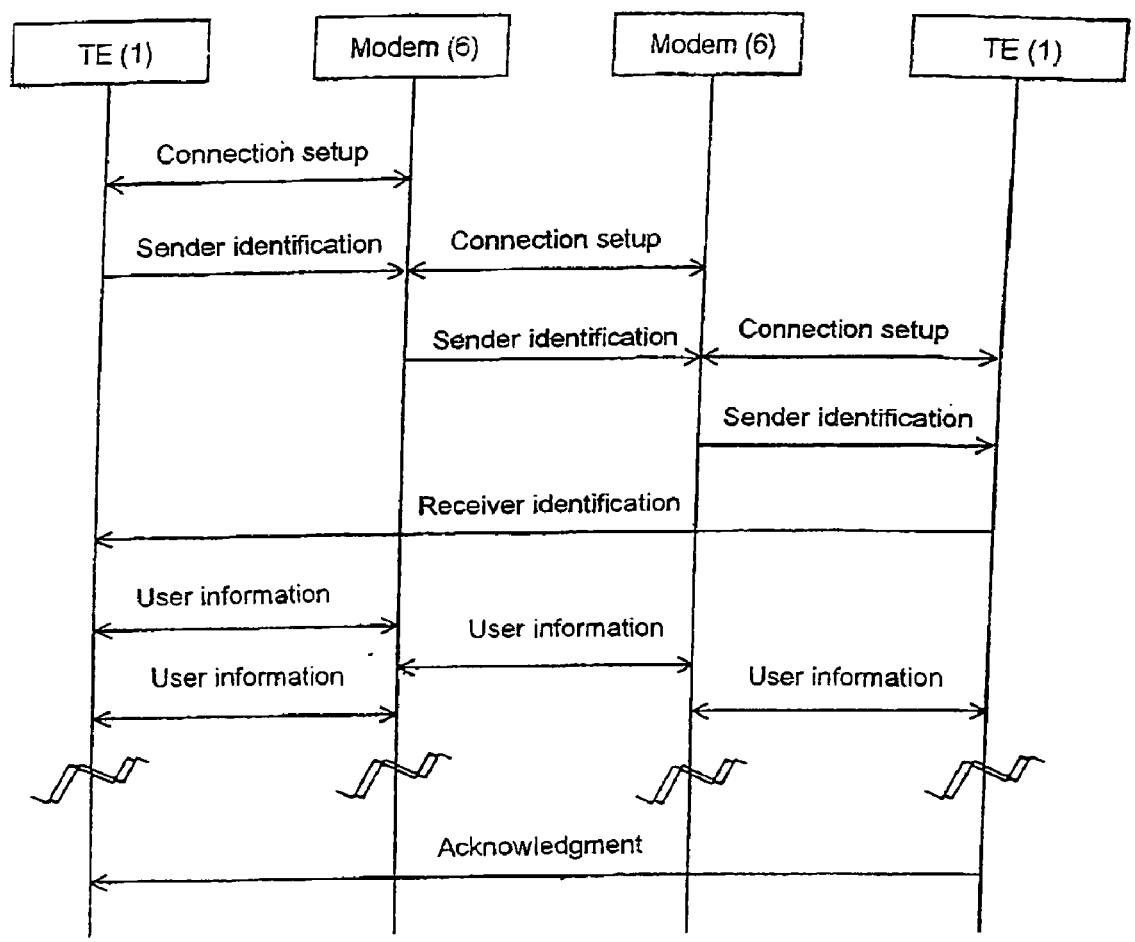
FIG. 4 shows a simplified schematic representation of information transmission.

A problem relating to the acknowledgment of the transmitted data may be solved by another embodiment of the method according to the present invention. Namely, when data is transmitted via a voice connection path, only an end-to-end acknowledgment of the transmitted data can be carried out. This results in the disadvantage that, in the event of a faulty transmission of the data, the transmission must be repeated over the entire transmission link. Owing to the section-wise transmission and acknowledgment of the data according to the present invention, the transmission of the data only has to be repeated over the section in which the error actually occurred. FIG. 4 shows an example of one possible practical implementation, by which the net data transmission rate is likewise improved.

After the voice connection path has been set up between terminal 1 and transition 5 (effected by a modem) between a data (user information) transmission in the voice connection path and a data transmission in the digital data network, the sender identification of terminal 1 is transmitted. For this purpose, it is not necessary that the connection to the other terminal 1 already be completely established. Namely, as soon as the connection sections to the receiving terminal have been set up, the sender identification is transmitted over these sections of the transmission link. Similarly, as shown in FIG. 4, the receiver identification is then transmitted in the reverse direction to the sending terminal. The user information is subsequently transmitted and acknowledged section-by-section. The final confirmation of successful transmission is then sent again directly from the receiving terminal to the sending terminal.

Since the technical parameters of the two terminals are not necessarily identical or do not have to be identical, it is apparent that different technical methods may be employed on the respective voice connection paths. Thus, it is possible for the two terminals to send and receive at different bit rates. According to the present invention, this problem is solved in that, at transitions 6 between data transmission in voice connection path 4 and data transmission in digital data network 7, the user data is temporarily stored for a brief time (depending on the speed difference to be compensated) for the purpose of speed matching and, if applicable, time gaps in the data stream are picked up by appropriate signaling.

Since in the case of data transmission in the voice connection path, the maximum possible transmission rate is not always required during the entire duration of the connection, in a further embodiment of a method according to the present invention, the data transfer in digital data network 7 may be effected at a non-constant bit rate and be flexibly adapted to the instantaneous requirements.

If a method according to the present invention for bandwidth reduction in voice connection paths is applied to the transmission of user information according to FAX class 3, particular efficiency is achieved when FAX messages are sent over long distances. Through the arrangement of transitions from FAX transmission in the voice connection path to FAX transmission in a data network available worldwide, such as the Internet or an X.25 network, it is possible to transmit the FAX message over expensive long-distance links at correspondingly reduced bit rate via a data network, while the message is distributed geographically from the transitions to the end user via standard voice connection paths which can be implemented using both conventional techniques and with the aid of digital data networks. It would be sufficient, for example, if in each case one of these transitions were installed in Moscow, Frankfurt, (as shown in FIG. 5), New York and Tokyo. For a large proportion of international FAX traffic, it would then no longer be necessary for the data to be transmitted in the voice connection path on intercontinental links.

Instead of establishing a new worldwide data network for the purpose of reducing bandwidth when transmitting data in the voice connection path, it is possible to utilize the existing INTERNET for this purpose.

The bottom part of FIG. 3 shows how bandwidth is saved on the expensive long-distance links which are implemented by digital data networks 7.

Since, however, there can be no guarantee in the INTERNET that the data transmitted therein will not be subject to unauthorized access, encryption by cryptographic processes may be employed. In the event that a computer or intelligent terminal is to be employed as a terminal, it is possible, using the appropriate software, to connect the computer or intelligent terminal directly to the digital data network. In this manner, using any personal computer (PC) connected to the INTERNET, it is possible, for example, to send a FAX message to a Group 3 terminal without this requiring any special adaptation of the participating hardware.

What is claimed is:

1. A method for reducing bandwidth when transmitting data between a sending terminal and a receiving terminal over a voice connection path using a digital data network, the method comprising:

converting, within the digital data network, a coding of user information of the transmitted data between a data transmission in the voice connection path and a data transmission in the digital data network so as to transmit the user information via the coded voice connection path on at least one first section of the digital data network and transmit the user information by a method suitable for the digital data network on at least one second section of the digital data network; and temporarily storing and converting the transmitted data and signaling information so as to match the respective data transmission processes of the sending and receiving terminals such that differences in the respective data transmission processes are not perceived by the sending and receiving terminals, wherein the sending and receiving terminals use different respective data transmission processes.

2. The method as recited in claim 1 further comprising splitting the user information into data packets for the transmitting over the digital data network, a transmission rate of the data packets being flexibly adapted at a network transition to a bit rate transmitted by the sending terminal.

3. The method as recited in claim 1 wherein at least one of the sending and receiving terminals is connected directly or via a digital transmission link to the digital data network so as to avoid a need to first code the data using either of the sending and receiving terminal for the data transmitting over the voice connection path and then a need to decode the coded data.

4. The method as recited in claim 1 wherein the digital data network includes an interconnection of a plurality of individual data networks.

5. The method as recited in claim 1 wherein the user information to be transmitted conforms to features of FAX class 3.

6. The method as recited in claim 1 further comprising, before the transmitting over the digital data network, protecting the data by cryptographic processes against at least one of passive monitoring, alteration and simulation of at least one of incorrect call data and contents.

7. The method as recited in claim 1 wherein the sending and the receiving terminals use a similar modulation method for transmitting the data over the voice connection path.

8. The method as recited in claim 1 wherein the transmitting the user information via the coded voice connection path on at least one first section of the digital data network is performed automatically by a context-related call-number translation during a connection setup so as not to be perceived by the sending and receiving terminals.

9. The method as recited in claim 8 wherein the transmitting the user information via the coded voice connection path on at least one first section of the digital data network is performed such that end-to-end signaling of the sending and receiving terminals for a sending/receiving terminal control of the data transmission is terminated at a transition into the digital data network and is newly generated so as to integrate a control of the data transmission by the digital data network into the end-to-end signaling.

* * * * *